United States Patent [19]

Cook et al.

[11] Patent Number: 4,530,058
[45] Date of Patent: Jul. 16, 1985

[54] INITIALIZATION APPARATUS FOR A BRAKE CONTROL SYSTEM

[75] Inventors: Robert D. Cook, Valencia; Thomas Skarvada, Granada Hills, both of Calif.

[73] Assignee: Crane Co., Chicago, Ill.

[21] Appl. No.: 394,485

[22] Filed: Jul. 1, 1982

Related U.S. Application Data

[63] Continuation-in-part of Ser. No. 132,112, Mar. 20, 1980, Pat. No. 4,338,667.

[51] Int. Cl.³ .................. B60T 8/02; G06F 15/20
[52] U.S. Cl. .................. 364/426; 244/111; 303/109
[58] Field of Search .......... 364/426; 303/95, 109; 244/110 A, 111

[56] References Cited

U.S. PATENT DOCUMENTS

| | | | |
|---|---|---|---|
| 3,768,873 | 10/1973 | Hirzel | 303/109 |
| 4,007,970 | 2/1977 | Romero | 244/111 X |
| 4,022,513 | 5/1977 | Hirzel et al. | 303/109 X |
| 4,180,223 | 12/1979 | Amberg | 364/426 |
| 4,338,667 | 7/1982 | Cook et al. | 364/426 |

FOREIGN PATENT DOCUMENTS

| | | |
|---|---|---|
| 1018548 | 1/1966 | United Kingdom. |
| 1380744 | 1/1975 | United Kingdom. |

OTHER PUBLICATIONS

European Search Report No. 36719, published Feb. 2, 1983, based on application No. 81300948.

*Primary Examiner*—Jerry Smith
*Assistant Examiner*—Clark A. Jablon
*Attorney, Agent, or Firm*—Willian Brinks Olds Hofer Gilson & Lione Ltd.

[57] ABSTRACT

An initialization apparatus for an antiskid brake control system including a modulator which generates a brake control signal as a time integral function of an error signal operates to initialize the modulator to a preselected value of the brake control signal when excessive braking action is sensed after a period of antiskid inactivity. The initialization apparatus also operates to initialize a reference signal in the direction of more aggressive braking and to bias the reference signal and a wheel signal toward more aggressive braking for a selected time period following initialization of the modulator.

21 Claims, 6 Drawing Figures

INITIALIZATION APPARATUS FOR A BRAKE CONTROL SYSTEM

IDENTIFICATION OF RELATED APPLICATION

This application is a continuation-in-part of copending U.S. patent application Ser. No. 132,112 filed Mar. 20, 1980, now U.S. Pat. No. 4,338,667.

BACKGROUND OF THE INVENTION

The present invention is directed to an apparatus for initializing a brake control system. The apparatus of this invention is particularly useful in brake control systems such as antiskid systems.

One important class of modern brake control systems modulates braking action to achieve the desired level of braking. These systems include a modulator which generates a brake control signal as a time integral function of the difference between a reference value and a measured wheel characteristic, such as velocity or acceleration. The brake control signal is indicative of the desired modulated braking action.

For example, one type of such brake control system is an antiskid system which compares wheel velocity with a reference velocity to generate an error signal which is integrated over time. The integrated error signal is then used to generate a modulated brake control signal. This control signal is summed with other brake control signals and then used to control an antiskid valve which acts to reduce braking action on command. Other modulating brake control systems integrate the difference between measured wheel acceleration and a reference acceleration in order to generate the modulated brake control signal.

Such modulator based brake control systems provide significant advantages, primarily in terms of smooth, efficient braking and skid control. Because of these advantages, such systems have found widespread application or modern commerical jet aircraft. U.S. Pat. No. 3,724,916, issued Apr. 3, 1973 to Edgar A. Hirzel, discloses an early example of such a modulating brake control system.

However, modulator based systems have in the past suffered from certain disadvantages related to efficient modulator initialization. Because the modulated brake control signal is a time integral function of the braked wheel's rotational behavior, it does not ordinarily change level abruptly. This can result in excessive braking action and skidding during the initial brake application. For example, many prior art braking control systems routinely use an initial skid at aircraft touchdown to generate a large error signal to initialize the modulator and the brake control system.

This approach in effect induces an initial skid, the depth and duration of which serves to initialize the modulator. Typically, between one and two skids are needed to raise the output of the modulator to the point where it begins to operate properly. During this initialization period, wheel skid generally passes beyond the desired level of slip of establish an error signal large enough to initialize the modulator. This in turn results in reduced braking effectiveness, increased tire wear, and undesirable tire heating during the initialization period. In addition to reduced braking effectiveness during the initialization period, elevated tire temperature caused by the initialization skids can reduce the maximum braking force available after skid recovery.

SUMMARY OF THE INVENTION

The present invention is directed to an improved apparatus for initializing a brake control modulator, which reduces the amount of skidding or wheel slip required for modulator initialization.

According to a first feature of this invention, means are provided for modifying the modulated brake control signal when a signal indicative of excessive wheel slip or skidding crosses a threshold value after remaining within a specified range of values for a selected time period. Preferably, the modifying means acts to rapidly adjust the brake control signal to a level suitable for maximum braking effectiveness for a dry runway surface.

This feature operates to quickly initialize the modulator to a point where it can begin to modulate properly. Only a limited amount of wheel slip is required to trigger to initialization and initialization is therefore faster than in the prior art systems described above. This reduces the depth and duration of the initial wheel skids and therefore improves braking effectiveness.

According to a second feature of this invention, means are provided for initializing a reference signal by modifying it in the direction of more aggressive braking at substantially the same time as the modulator is initialized. Initialization of the reference signal permits the brake control system to adapt quickly to the optimum degree of wheel slip.

A third feature of the invention also relates to improved adaptability of the brake control system. During an aircraft landing, the maximum available braking force typically rises rapidly as the aircraft settles, the spoilers are deployed, and more and more weight is supported by the wheels. During this initial period of rising available braking force, it has been found advantageous to operate the braking system in an aggressive braking mode in which the modulator reapplies the brakes more quickly and forcefully after they have been relaxed due to excessive wheel slip. This permits the braking system to quickly detect and take advantage of the increased available braking force. The braking system is not allowed to stabilize during the abnormally reduced braking effectiveness found immediately after touchdown. Instead, the adaptability of the brake control is kept high for an initial period.

Preferably, this third feature of the invention includes means for biasing the reference signal toward more aggressive braking during an initial period which begins at substantially the same time as modulator initialization. For example, in velocity based brake control systems, the reference velocity is preferably made to decrease at a faster than usual rate for a short period of time following initialization of the modulator. In a second preferred embodiment, the reference signal is prevented from changing in the direction of less aggressive braking for the initial time period discussed above.

The invention, together with further objects and attendant advantages, will be best understood by reference to the following detailed description taken in connection with the accompanying drawings.

DETAILED DESCRIPTION OF THE PRESENTLY PREFERRED EMBODIMENTS

Figure 1:
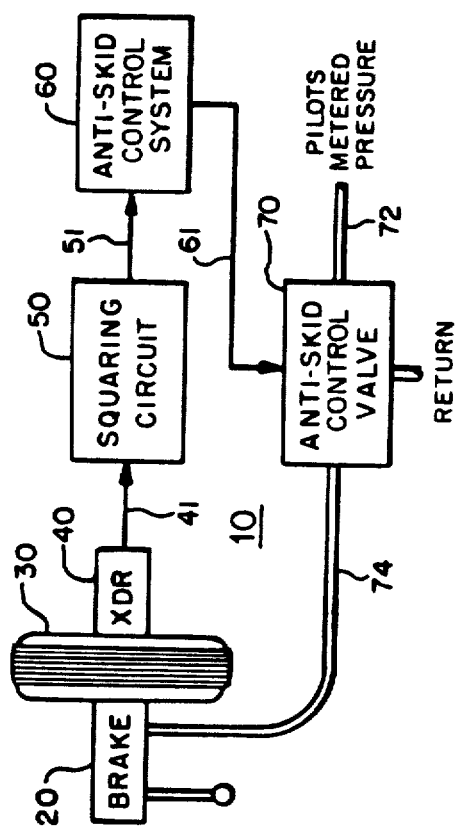
FIG. 1 is a schematic representation of a brake control system including an antiskid control system.

Referring now to the drawings, two preferred embodiments of the initialization apparatus of the present invention will be described in connection with the brake control system shown in FIGS. 1 and 2. FIG. 1 shows the major components of an antiskid brake control system 10 which provides brake control for the brake 20 of a rotatable wheel 30. The system 10 includes a wheel-speed transducer 40 which produces a sinusoidal signal on line 41 having a frequency proportional to the angular velocity of the wheel 30. The signal on line 41 is shaped in a squaring circuit 50 and is then supplied as a wheel speed signal to an antiskid control system 60 via line 51. The antiskid control system 60 monitors the wheel signal on line 51. When the wheel signal indicates that the wheel 30 is about to go into a skid due to excessive braking force, the antiskid system 60 generates a brake control signal on line 61. The antiskid control valve 70 is positioned in the brake line 72 which supplies brake fluid under pressure to the brake 20, and the valve 70 operates in response to the signal on line 61 to reduce the brake pressure applied to the brake 20.

In this control system 10, the brake pressure in line 72 is the metered pressure determined by the vehicle operator by means of conventional hydraulic controls. As long as the wheel 30 is not braked so severely as to go into a skid, the full metered pressure in the line 72 is passed by the valve 70 via the line 74 to the brake 20. However, if the metered brake pressure exceeds the skid threshold and drives the wheel 30 into a skid, the antiskid system 60 will generate a brake control signal on line 61 which causes the valve 70 to reduce the pressure in the line 74 to a value less than the metered pressure. By reducing the pressure applied to the brake 30, the braking torque is reduced and the wheel 30 is prevented from skidding.

Figure 2:
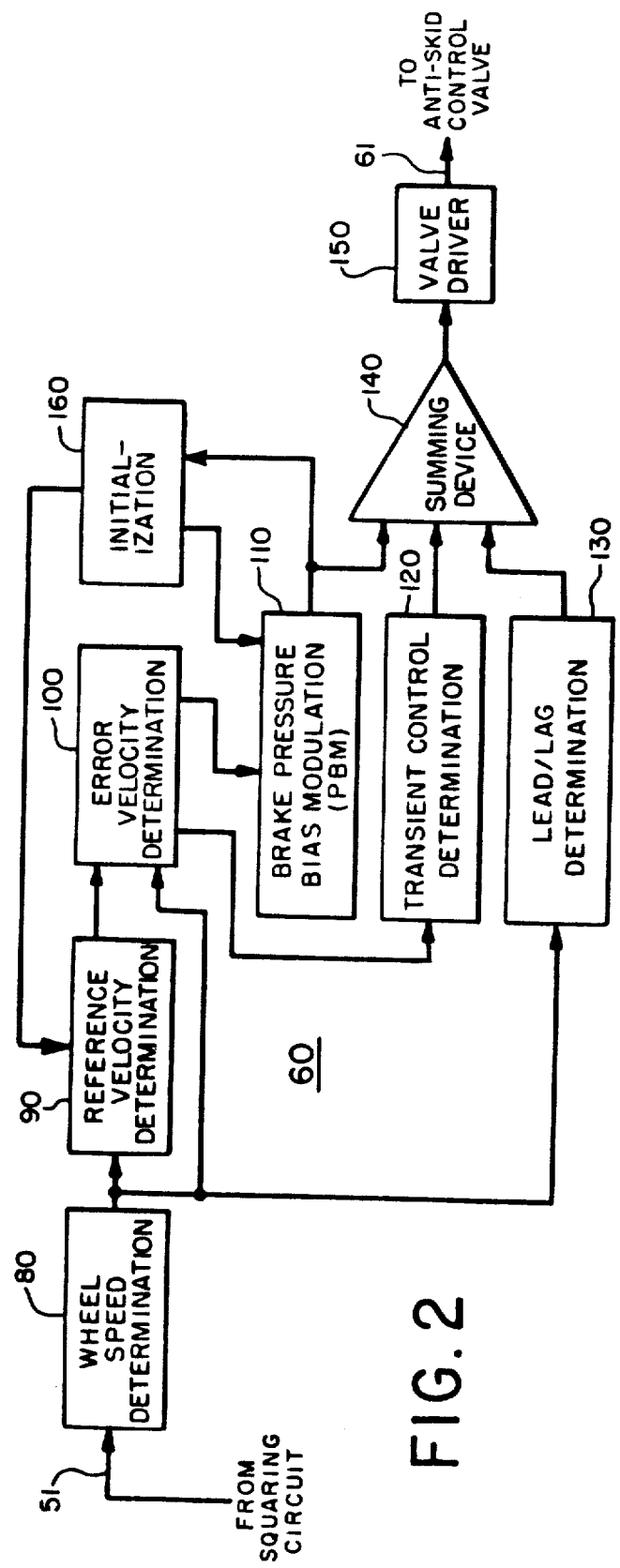
FIG. 2 is a schematic representation of the functional components of the antiskid control system of FIG. 1.

FIG. 2 shows a schematic representation of the antiskid system 60 of FIG. 1, including a wheel speed determination unit 80 which uses the wheel signal on line 51 as an input and generates an output signal representative of measured wheel speed. This wheel speed signal is supplied as an input to a reference velocity determination unit 90 for generating a reference velocity signal representative of the desired wheel speed for optimum braking. This reference velocity signal is applied as an input to an apparatus 100 for determining an error velocity signal representative of the difference between the measured wheel speed signal and the reference velocity signal. The error velocity signal is applied as an input to two separate control units: the brake pressure bias modulation unit, or modulator 100, and the transient control determination unit 120.

The modulator 10 integrates the error velocity signal over time to arrive at a time averaged, modulated signal representative of the optimum braking pressure. This signal is smoothly and continuously modulated to either increase or decrease the applied brake pressure as needed to substantially prevent excessive wheel skidding while maintaining a high, effective level of braking.

Because the output of the modulator 110 is a time integral function of the error velocity signal, it will on occasion be unable to respond quickly enough to prevent a wheel skid. For example, when a braked wheel suddenly enters a tar strip or an ice patch or a wet surface, the skid threshold will abruptly fall and the wheel may enter a deep skid if heavily braked. Under these conditions, the transient control unit 120 responds to a large error velocity signal by commanding a sharp and sudden reduction in applied brake pressure.

The wheel speed signal is also supplied as an input to a lead/lag unit 130 which responds to changes in the wheel speed signal to anticipate trends and to command an early modification in brake pressure to anticipate skids.

Outputs from the modulator 110, the transient control unit 120, and the lead/lag unit 130 are summed in a summing device 140 to produce a composite brake control signal which is amplified by the valve driver 150 and then applied as a control signal via line 61 to the antiskid control valve.

The foregoing description of the brake control system 10 is provided to set forth the environment of a preferred embodiment of the initialization apparatus of this invention. Individual components of this environment do not form a pat of the present invention, and for that reason have not been described in detail here. Furthermore, those skilled in the art are familiar with various forms of these components. For example, one form of the wheel speed determination unit 80, the error velocity determination unit 100, the modulator 100, the transient control unit 120, and the lead/lag unit 130 is shown in U.S. Pat. No. 3,724,916, issued Apr. 3, 1973 to Edgar A. Hirzel, and entitled "Controlled Wheel Braking System". Other forms of the wheel speed determination unit 80 are described in U.S. Pat. No. 4,056,287, issued Nov. 1, 1977 to Wolfgang Gudat; and in U.S. Pat. No. 4,125,295, issued Nov. 14, 1978 to Gerhard Ruhnam, et al.

The present invention is directed to an improved initialization apparatus for a brake control system. A first preferred embodiment of this invention, included in initialization unit 160 of FIG. 2, will be described in conjunction with the flow chart of FIG. 3, and a second preferred embodiment will be described in conjunction with the flow chart of FIG. 5.

THE FIRST PREFERRED EMBODIMENT

The first preferred embodiment of the present invention is implemented as a programmed microprocessor. The presently preferred microprocessor is a Z-80 CPU manufactured by Zilog, Inc., Cupertino, Calif. The program is presented in flow chart form in FIG. 3 and is listed in assembly language form in Table 1.

This program monitors the control signal output of the modulator 100 to determine the appropriate time to initialize the modulator 110 and the reference velocity determination unit 90, and then accomplishes the initialization by introducing a step function modification to the output of the modulator circuit 110 and the reference velocity signal at the appropriate time.

Figure 3:
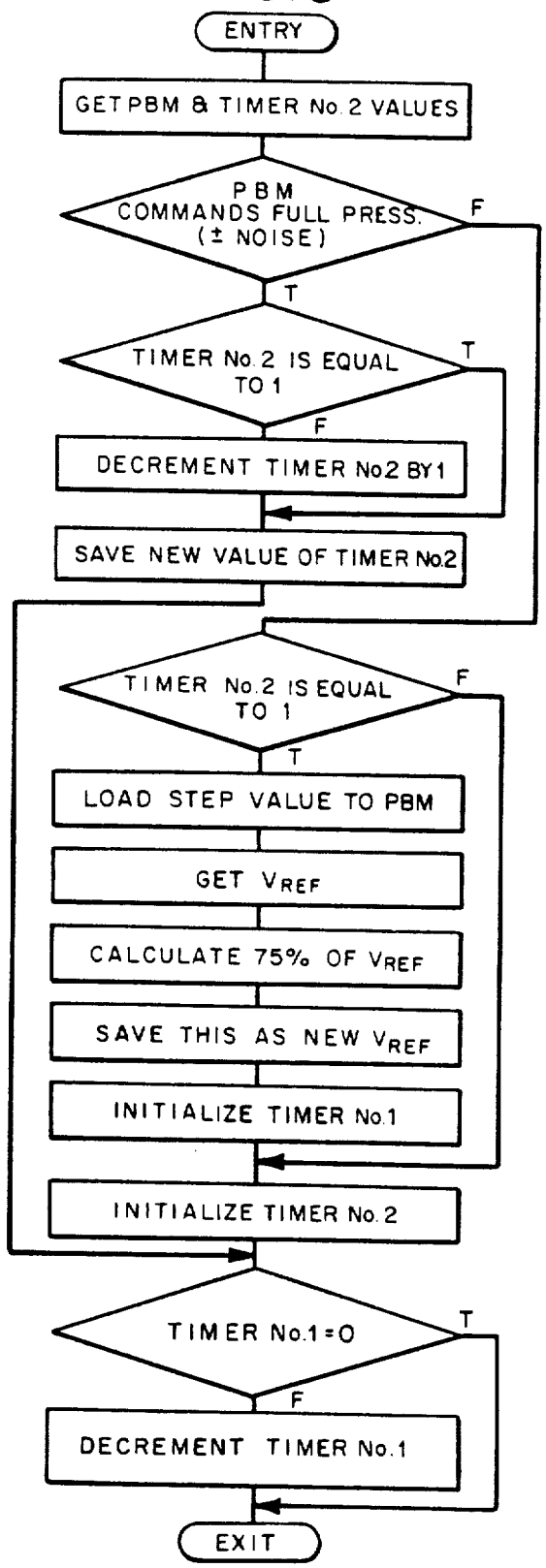
FIG. 3 is a flow chart of a first preferred embodiment of the initialization portion of the antiskid control system of FIG. 2.

Turning now to FIG. 3, the first preferred embodiment of the invention maintains a timer (Timer #2 in FIG. 3) which is used to determine when the modulator unit 110 has been commanding substantially no pressure reduction by the antiskid valve for more than a predetermined time interval. The program of FIG. 3 is in this embodiment executed about 203 times per second. At each pass through the program the output signal (PBM) of the modulator 110 is sampled and compared with a threshold value (LOWPBM). This threshold value is set equal to a low modulator output which corresponds to substantially to reduction in brake pressure applied to the brake 20, with a small allowance for noise. In this embodiment, the threshold value is set to correspond to a antiskid valve current of about one milliamp.

Depending on the outcome of the comparison between the modulator output and the threshold, the program branches. If the modulator output is below the threshold, corresponding to a valve current less than 1 milliamp, TIMER #2 is decremented by 1 if it is greater than 1 or left unchanged if it is equal to 1. The minimum value of TIMER #2 is 1, and when TIMER #2 is equal to 1 it indicates that the antiskid valve current commanded by the modulator 110 has been substantially zero for a period greater than the time required for TIMER #2 to time out. An additional timer (TIMER #1) is decremented by 1 in this branch of the program if greater than zero.

If the modulator output is above the threshold LOWPBM the program enters a second branch in which TIMER #2 is examined to see if it has timed out, indicating that the modulator output is now above the threshold value after an extended period of time below the threshold. If it has, this is taken as an indication that the modulator output and the reference velocity are to be initialized. To accomplish this, the modulator output is set equal to a selected value (PBMSTP) and the reference velocity is set equal to 75% of its previous value. TIMER #2 and TIMER #1 are both then initialized, and TIMER #1 is decremented by 1 if greater than zero.

In this first preferred embodiment, the initialization value for TIMER #2 is 74 hexadecimal, which equals 116 decimal and corresponds to a timer interval of 0.57 seconds. Thus, this embodiment operates to initialize both the modulator output and the reference velocity every time the modulator output exceeds the threshold value after remaining below that threshold for 0.57 seconds or more. In operation, this will happen during the initial skid of an aircraft touchdown, and then again whenever a wheel enters a skid after a period of antiskid inactivity.

Preferably, the initialization value PBMSTP for the modulator output signal is set at a value appropriate for skid control on a dry runway under normal circumstances. This is particularly true for modulators of the type which act to reduce brake pressure more quickly than to increase brake pressure. In practice, the initialization value is set empirically to minimize stopping distance for the desired conditions. Preferably, the antiskid valve 70 is a single gain valve of the type described in U.S Pat. No. 4,130,322, for in this case brake pressure is a function of only the control signal on line 61, as long as the metered pressure on line 72 exceeds the pressure commanded by the control signal. When such an antiskid valve 70 is used the initialization value actually corresponds to an initialization brake pressure, assuming the pilot has commanded adequate pressure.

In addition, the preferred embodiment of FIG. 3 controls TIMER #1 which affects the manner in which the reference velocity is determined. As shown in FIG. 3, TIMER #1 is initialized whenever the modulator output and reference velocity are initialized, and TIMER #1 is decremented each time the program of FIG. 3 is executed. In this preferred embodiment, TIMER #1 is initialized to 77 hexadecimal, or 119 decimal. Approximately 0.58 second therefore elapses between the time TIMER #1 is initialized and the time TIMER #1 is next decremented to zero.

Figure 4B:
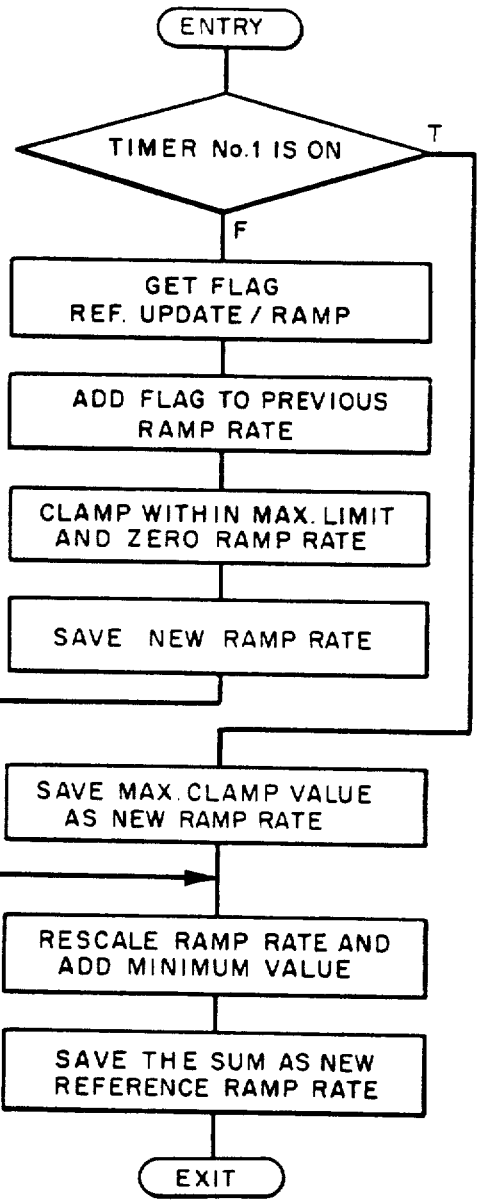
FIGS. 4a and 4b are flow charts of the reference velocity determination portion of the anti-skid control system of FIG. 2 used in connection with the embodiment of FIG. 3.
Figure 4A:
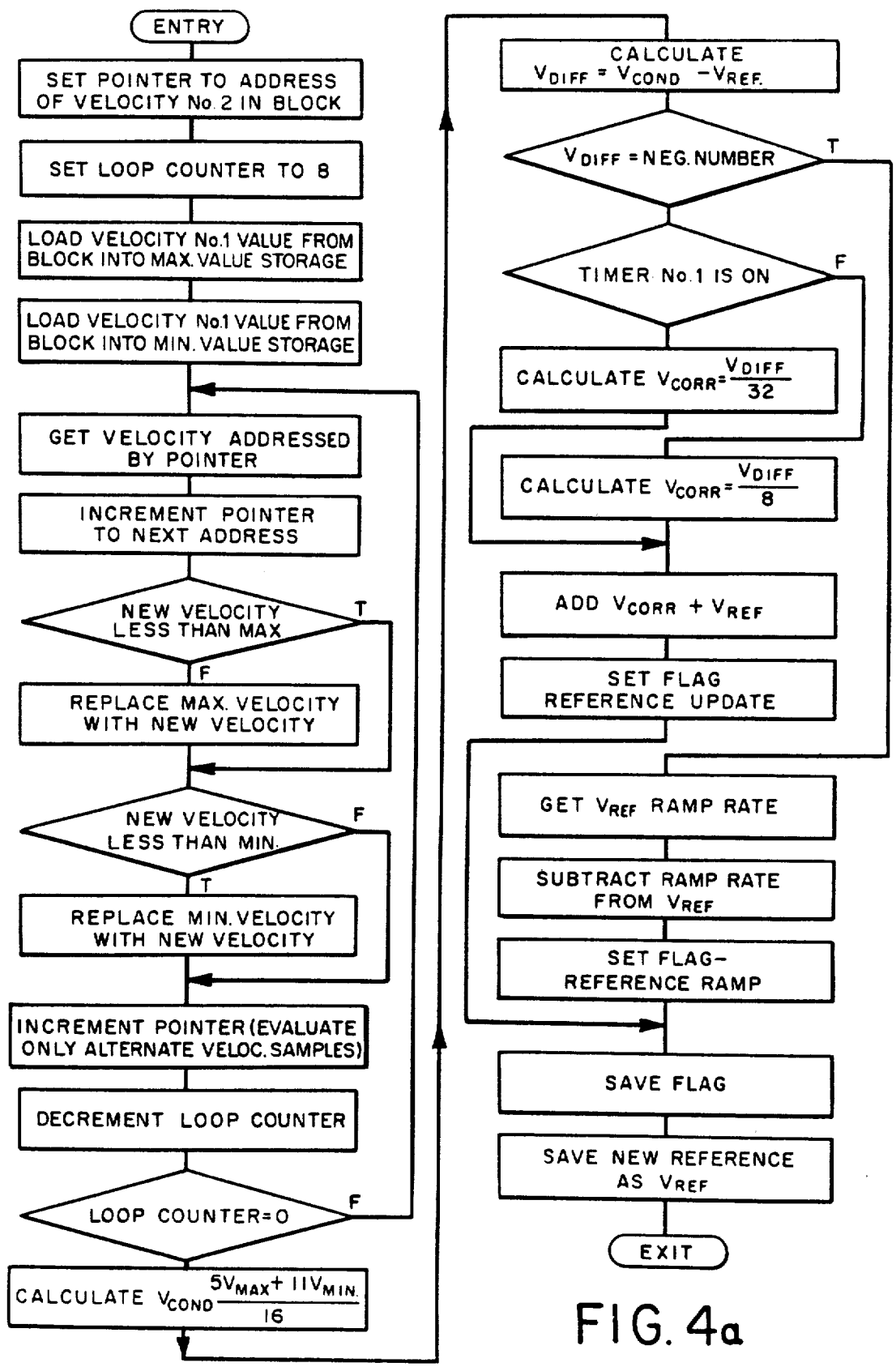

During the time when TIMER #1 is not equal to zero, the Reference Velocity Determination Unit 90 of FIG. 3 operates to bias the reference velocity more strongly towards lower values. FIGS. 4a and 4b provide a flow chart of the operation of the Reference Velocity Determination Unit 90. Tables II and III list the programs of FIGS. 4a and 4b in assembly language.

Referring to FIG. 4a, this program first calculates a conditioned velocity signal ($V_{COND}$), which is approximately equal to the current average velocity signal from the braked wheel with some allowance for oscillations in the velocity signal. The conditioned velocity signal is then compared with the reference velocity, which is revised depending on the outcome of the comparison.

If the conditioned velocity signal is greater than the reference velocity, then the reference velocity is increased, or updated, by an amount proportional to the difference between the two. The proportionality factor is one-thirty-second when TIMER #1 is not equal to zero and one-eighth otherwise. The reference velocity is biased towards lower velocities during the initialization period then TIMER #1 is non-zero, because the reference velocity is increased by a smaller fraction of the difference during this period.

On the other hand, if the conditioned velocity is less than the reference velocity, the reference velocity is reduced, or ramped, by a predetermined amount, the ramp rate, which is calculated by the program of FIG. 4b. As shown in FIG. 4b, the calculation of the ramp rate is dependent on TIMER #1. During the initialization period, when TIMER #1 is non-zero, the ramp rate is set to a maximum value, which in this embodiment corresponds to 0.053 feet per 5 millisecond. At other times it is calculated by adding an amount to the previous ramp rate, which amount varies according to whether the reference velocity was increased or decreased during the last execution of the program of FIG. 4a. In the program of FIGS. 4a and 4b the ramp rate is decreased by about 0.0008 feet per second each time the reference velocity is greater than the conditioned velocity and the ramp rate is increased by about 0.0001 feet per second each time the reference velocity is less than the conditioned velocity.

The details of how the ramp rate is set when TIMER #1 is equal to zero and how the conditioned velocity signal is calculated do not in themselves form part of the present invention. These details, which are set forth in detail in commonly assigned U.S. patent application Ser. No. 060,573, now U.S. Pat. No. 4,323,969, are presented here merely to elucidate the environment of the invention as it relates to determination of a reference signal such as a reference velocity during an initialization period.

Because TIMER #1 is non-zero for a period of about 0.58 seconds following initialization of the modulator, it is during this period that the reference velocity is biased towards lower velocities. This results in more aggressive application of brake pressure during the initialization period than at other times. Thus, as the airplane settles on its wheels after the initial touchdown, the antiskid system rapidly adapts to the increased available braking force by aggressively commanding a lesser reduction in brake pressure than at other times.

The programs of FIGS. 3, 4a and 4b are listed in assembly language in Tables 1, 2a, 2b and 2c. Table 1 corresponds to the program of FIG. 3; Table 2a corresponds to the program of FIG. 4a; Table 2b corresponds to the program of FIG. 4b and Table 2c provides a listing of the constants and variables used by the programs of Tables 2a and 2b. In order to better understand these listings, it should be understood that the wheel speed measurements stored in the velocity block as VELOC1 through VELOC16 are stored as sixteen-bit binary numbers scaled to 0.1 feet per second at the least significant bit. The reference velocity $V_{REF}$ corresponds to the variable REFER which is a twenty-four-bit binary number scaled to about 0.000391 foot per second at the least significant bit, and the ramp rate corresponds to RAMP and is scaled identically to REFER. Preferably the programs of Tables 1, 2a and 2b are each executed after each wheel speed measurement is made, about once every 5 milliseconds in this embodiment.

Each of the foregoing aspects of the invention contributes to improved initialization of a modulating antiskid system. Modulator initialization rapidly brings the modulator to a point where it can begin to modulate brake pressure effectively. Initialization of the reference signal rapidly brings the reference signal to a point where the antiskid system is aggressively controlling the brakes, and biases the reference signal in the direction of aggressive braking for an initial period. These advantages are obtained while reducing the severity and duration of the initial wheel skid, thereby minimizing the tire heating and reduction in braking efficiency associated with such skids. Improved braking efficiency is particularly important at high vehicle speed, because a skid at high speed generally results in a greater increase in total stopping distance than does a skid at low speed. The present invention reduces the depth and duration of initial touchdown skids, and therefore contributes to high braking efficiency and reduces the overall braking distance.

THE SECOND PREFERRED EMBODIMENT

A second preferred embodiment of the reference signal generating apparatus of this invention will be described in connection with FIG. 5 and Tables 3a and 3b. This second preferred embodiment is designed to be used in conjunction with a digital, velocity based antiskid system which generates a new measure of the rotational speed of the braked wheel once every 5 milliseconds. The program of FIG. 5 and Tables 3a, 3b is executed after every new measure of wheel speed, or once every 5 milliseconds. This preferred embodiment utilizes a programmed Z-80 microprocessor, as does the first preferred embodiment discussed above.

Figure 5:
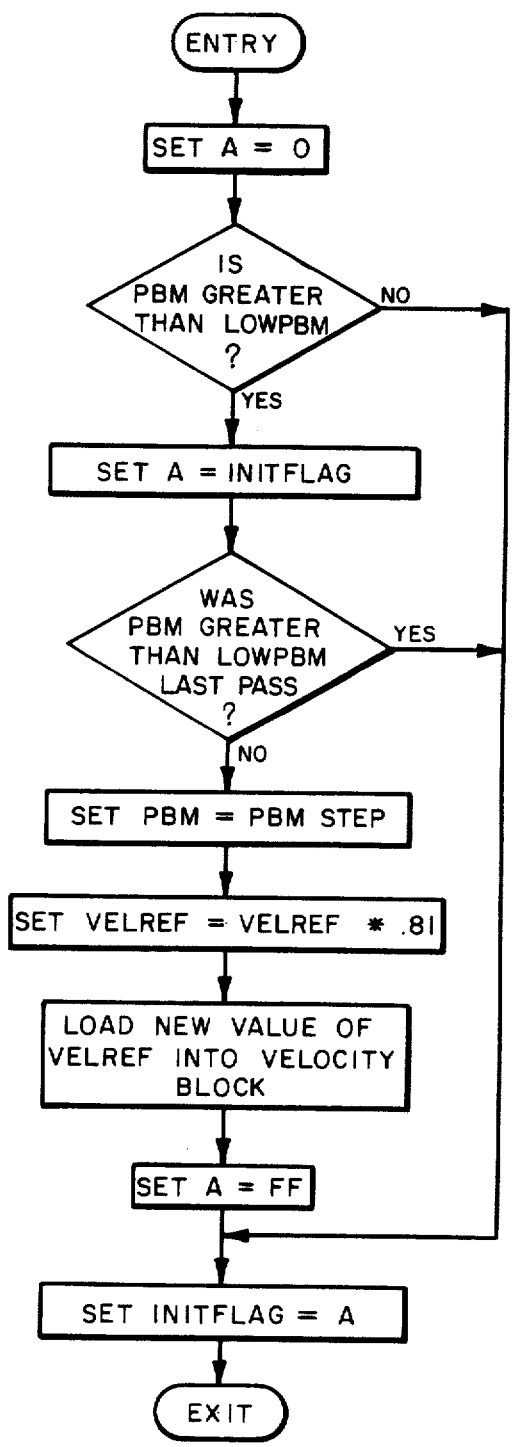
FIG. 5 is a flow chart of a second preferred embodiment of the initialization portion of the antiskid control system of FIG. 2.

FIG. 5 is a flow chart of the program listed in Table 3a. It is intended that the limiting of Table 3a be taken as the primary disclosure, and that FIG. 5 and the following detailed description be regarded as a clarification of the listing.

Referring now to FIG. 5, this program makes reference to a number of variables that are supplied by or located in the programs included in the remainder of the antiskid program. PBM is a pointer to a modulated brake control signal which corresponds to the modulator output. This variable is a 16 bit variable which is clamped to the range between zero and ODOO (HEX) and is correlated linearly with the valve current associated with the modulated brake control signal. A PBM value of zero corresponds to zero valve current, and a PBM value of ODOO (HEX) corresponds to maximum valve current (45 milliamps in this embodiment). The copending patent application Ser. No. 394,484, filed July 1, 1982 which is a continuation-in-part of application Ser. No. 147,386, now U.S. Pat. No. 4,338,669 describes in detail one system for generating this modulated brake control signal.

VELREF is a pointer to a reference velocity signal, a 24 bit variable scaled to 0.000391 ft/sec. at the least significant bit. Positive values of the reference velocity signal correspond to positive velocities and a zero value corresponds to a zero velocity. The copending patent application Ser. No. 394,130 which is a continuation-in-part of application Ser. No. 363,476 now abandoned describes in detail one system for generating this reference velocity signal.

VELBLOCK is a pointer to a velocity block of seven 16 bit numbers, each of which corresponds to a separate velocity. The patent application identified in the preceeding paragraph describes the way in which the velocity block is maintained as a FIFO file and numbers loaded in the file are kept in the file for 14 loop times, or about 70 milliseconds, and then discarded. Thus, a number loaded into the velocity block is resident in the block for 70 milliseconds before it is automatically removed. As explained in that application, whenever the reference velocity signal is less than the minimum value stored in the velocity block, the reference velocity is updated by setting it equal to the minimum velocity. Generally, the velocity block stores 7 measurements of the velocity of the braked wheel made during the last 70 milliseconds, and therefore noise in the velocity measurement (due to truck pitch oscillations, for example) does not result in a reference velocity which is erroneously high.

The program of FIG. 5 initially compares PBM (stored in HL register pair on entry to the program) with a threshold value LOWPBM. In this preferred embodiment, LOWPBM is equal to 4A (HEX), a value which corresponds to 1 milliamp of valve current. In general, LOWPBM should be set to a low value which is still above the noise level such that LOWPBM is indicative of a modulated brake control signal which commands substantially no brake pressure reduction. If PBM is less than LOWPBM (indicating that there is no need for initialization due to low modulator activity) then the program of FIG. 5 returns, setting the flag INITFLAG to zero to indicate that no initialization was performed. Similarly, if PBM is greater than LOWPBM and it was greater than LOWPBM on the last execution of the program (indicating that there is no need for initialization due to continued modulator activity) then the program of FIG. 5 returns, without altering INITFLAG.

However, if PBM is less than LOWPBM on one execution of the program of FIG. 5 and PBM is greater than LOWPBM on the next execution, then both the modulator and the reference velocity signal are initialized and the reference velocity signal is biased towards more aggressive braking for a period of about 0.070 seconds. Thus, if the value of PBM is less than LOWPBM for even a short time (as little as one loop time or 0.005 second) and then rises to a value greater than LOWPBM, initialization will be performed. This means that the program of FIG. 5 can operate to initialize the modulator and the reference signal many times during a single braking procedure such as a braked aircraft landing.

The program of FIG. 5 initializes PBM by setting it equal to a predetermined constant PBMSTEP. In this embodiment, PBMSTEP is chosen to correspond to a valve current of about 10 milliamps. In general, the value of this constant should be chosen in the manner described above in connection with the first preferred embodiment.

The reference velocity signal VELREF is initialized by setting it to 81% of its current value. The multiplication operation is performed by the subroutine MULTIPLX, which is listed in Table 3b.

The program of FIG. 5 biases the reference velocity in the direction of more aggressive braking by loading the new value of VELREF (which is equal to 0.81 times the old value of VELREF) into the velocity block. As explained above, the means for generating the reference velocity VELREF increases VELREF (i.e., alters VELREF in the direction of less aggressive braking) only when VELREF is less than the minimum value stored in the velocity block. By loading the new value of VELREF into the velocity block, it is ensured that VELREF will not be increased above its initialized value for the next 0.070 seconds. During this period of time VELREF will not be altered in the direction of less aggressive braking. In this way, VELREF is maintained at a value no greater than its initialized value for a sufficient period of time to enable the modulator to begin to function properly.

It should be understood that the initialization apparatus of this invention is not limited to use with modulators such as those described in above-identified application Ser. No. 06/394,484, nor is it limited to use with reference signal generating systems such as those described in above-identified application Ser. No. 06/394,130. Rather, this invention can be used with the widest range of modulators and reference signal generating systems, in both acceleration based and velocity based systems. The above-identified patent applications have been referenced merely to clarify the environment for this preferred embodiment, and do not in themselves form part of this invention.

The two embodiments of the invention described above monitor the output signal of the modulator to determine when to initialize the anti-skid system. Alternate embodiments monitor other signals indicative of excessive braking action. For example, the error signal integrated by the modulator, i.e., the difference between the wheel signal and the reference signal, can also be monitored as an indication that a wheel is entering a skid after a period of no skidding and thus that it is appropriate to initialize.

Of course, it should be understood that various changes and modifications to the embodiments described above will be apparent to those skilled in the art. For example, the invention can be used with acceleration based antiskid systems as well as velocity based antiskid systems. In addition, details of operation such as the timing intervals of the timers and the threshold values may be altered to fit individual applications. Moreover, the invention may be embodied in analog as well as digital form. It is therefore intended that the foregoing detailed description be regarded as illustrative rather than as limiting, and that it be understood that it is the following claims, including all equivalents, which are intended to define the scope of this invention.

TABLE 1

```
  ;
  ;            INITIALIZATION
  ;            **************
5 ;
  HOUSEX       LD DE,(PBM); GET PBM
               LD HL,LOWPBM; THRESHOLD FOR STEP
               XOR A
               SBC HL,DE
10             LD A,(TIMER); GET TIME COUNTER
               JR NC,HOUSEA
               DEC A
               JR NZ,HOUSEB
               INC A
15 HOUSEB      LD (TIMER),A; SAVE NEW VALUE
               JR HOUSEE
  ;
  HOUSEA       CP 1
               JR NZ,HOUSEC
20             LD HL,PBMSTP; LOAD PBM STEP VALUE
               LD (PBM),HL
               LD HL,(REFER+1)
               LD D,H
               LD E,L
25             SRL D
               RR E
               SRL D
               RR E
               XOR A
30             SBC HL,DE
```

```
                    JR NC,HOUSED
                    LD HL,0
       HOUSED       LD (REFER+1),HL
                    LD (IY+FORTIM-RAM),FORCE
35     HOUSEC       LD (IY+TIMER-RAM),74H; COUNT FOR .58 SECOND
       HOUSEE       LD A,(FORTIM)
                    CP 0
                    JR Z,HOUSEF
                    DEC (IY+FORTIM-RAM)
40     HOUSEF       RET
       ;
       ;
       PBM          EQU 80AH; MODULATOR OUTPUT (TWO BYTES)
       LOWPBM       EQU 7DAAH; MODULATOR THRESHOLD
45     TIMER        EQU 80DH; TIMER #2 FOR MODULATOR INITIALIZATION
       PBMSTP       EQU 22ECH; MODULATOR STEP
       REFER        EQU 807H; REFERENCE VELOCITY (3 BYTES)
       RAM          EQU 800H; BEGINNING OF RAM
       FORTIM       EQU 811H; TIMER #1
50     FORCE        EQU 0FFH; INITIALIZATION VALUE FOR TIMER #1
```

<div align="center">TABLE 2a</div>

```
       ;
       ;            REFERENCE VELOCITY DETERMINATION
       ;            *******************************
5      ;
       REFX         LD HL,VELOC2
                    LD B,7 ;   LOOP COUNT
                    EXX
                    LD DE,(VELOC1)
10                  LD B,D
                    LD C,E
                    EXX
       ;
       REFA         LD A,(HL) ; SET LOW BYTE
15                  EX AF,AF
                    INC HL
                    LD A,(HL) ; SET HIGH BYTE
                    INC HL
                    EXX
20                  LD H,A
                    EX AF,AF
                    LD L,A ; MOVE VELOCITY TO HL
                    CP A
                    SBC HL,DE ; COMPARE WITH MAX
25                  JR NC,REFB
                    ADD HL,DE ; RECOVER NEW VELOCITY
                    JR REFC
       REFB         ADD HL,DE ; RECOVER NEW VELOCITY
                    LD D,H
30                  LD E,L
       REFC         CP A
                    SBC HL,BC ; COMPARE WITH MIN VELOCITY
                    JR NC,REFD
                    LD C,A
35                  EX AF,AF
                    LD B,A ;   SAVE NEW AS MIN
       REFD         EXX
                    INC HL ;   SKIP EVERY OTHER VELOCITY IN BLOCK
                    INC HL
40                  DJNZ REFA ; LOOP FOR WHOLE VELOCITY BLOCK
       ;
                    EXX
```

```
              LD H,D
              LD L,E ; MOVE MAX VELOCITY
              XOR A
              SBC HL,BC ; GET DIFFERENCE
              EX DE,HL
              ADD HL,BC
              SRL D
              RR E ; DIVIDE BY 2
              XOR A
              SBC HL,DE
              SRL D
              RR E
              ADD HL,DE
              SRL D
              RR E
              XOR A
              SBC HL,DE
              SRL H
              RR L
              LD DE,(REFER+1)
              XOR A
              SBC HL,DE
              JR C,REFE
     ;
     ;        REFERENCE UPDATE
     ;
              LD C,L
              LD L,H
              LD H,O
              LD A,(FORTIM); GET TIMER VALUE
              CP O
              JR NZ,REFK
              JR REFF;        FINE TUNE ADDRESS DURING TESTING
              SLA C
              ADC HL,HL
              SLA C
              ADC HL,HL
     REFF     SLA C
              ADC HL,HL
              SLA C
              ADC HL,HL
     REFK     SLA C
              ADC HL,HL
              SLA C
              ADC HL,HL
              SLA C
              ADC HL,HL
              LD A,(REFER)
              ADD A,C
              ADC HL,DE
              LD (REFER+1),HL;   UPDATE REFERENCE
              LD (REFER),A
              LD DE,RTDOWN
              JR REFG
     ;
     ;        REFERENCE RAMP
     ;
     REFE     EX DE,HL  ;  MOVE REFERENCE TO HL
              LD A,(RAMP)
              LD C,A
              LD A,(REFER);     GET SCALER
              LD DE,O
              SUB C
              SBC HL,DE;        SUBTRACT CARRY IF ANY
              JR C,REFH
```

```
                    SUB C
                    SBC HL,DE
                    JR NC,REFI
         REFH       LD HL,0
         REFI       LD (REFER),A; SAVE NEW SCALER
                    LD (REFER+1),HL; SAVE NEW REFERENCE
                    LD DE,RTUP
         ;
         REFG       LD (SCORE),DE
         ;
                    LD DE,MAXREF; REFERENCE LIMIT (ANY SPEED ABOVE
         ;                        THIS CONSTITUTES A FAILURE)
                    EX DE,HL
                    XOR A
                    SBC HL,DE
                    JR NC,REFJ; JUMP, REFERENCE WITHIN RANGE
                    LD DE,MAXREF;    OTHERWISE CLAMP REFERENCE
                    LD (REFER+1),DE
         REFJ       RET;       RETURN
```

TABLE 2b

```
         ;          REFERENCE RAMP RATE DETERMINATION
         ;          **********************************
         ;
         AVDECX     LD A,(FORTIM)
                    CP 0
                    JR NZ,AVDECC
                    LD DE,(SCORE)
                    LD HL,(DECEL)
                    ADD HL,DE
                    LD (DECEL),HL
                    EX DE,HL
                    BIT 7,D
                    JR Z,AVDECB
                    LD DE,0
                    JR AVDECA
         AVDECB     LD HL,MAXDEC*256
                    XOR A
                    SEC HL,DE
                    JR NC,AVDECA
         AVDECC     LD DE,MAXDEC*256
         AVDECA     LD (DECEL),DE
                    LD A,D
                    ADD A,MINDEC
                    LD (RAMP),A
                    RET;       RETURN
```

TABLE 2c

```
         ;
         ;          ******
         ;          *    *
         ;          * RAM *
         ;          *    *
         ;          ******
         ;
         DECEL      EQU 80EH;  REF RAMP RATE (TWO BYTES)
         ERROR      EQU 815H;  ERROR VALUE FOR CONTROL (TWO BYTES)
         FORTIM     EQU 811H;  TIMER FOR SLOW REFER. UPDATE
         RAMP       EQU 810H;  TIME CONSTANT FOR REFERENCE RATE
         REFER      EQU 807H;  REFERENCE (THREE BYTES)
         SCORE      EQU 81BH;  TEMP STORAGE FOR REFER RATE GENERATION
         VELOC1     EQU 820H;  NEW VELOCITY
         VELOC2     EQU 822H;  PREVIOUS VELOCITY (ONE LOOP TIME BACK)
```

```
         VELOC3    EQU 824H;   "          "        (TWO LOOP TIMES BACK)
         VELOC4    EQU 826H;   "          "        (THREE LOOP TIMES BACK)
         VELOC5    EQU 828H;   "          "        (FOUR LOOP TIMES BACK)
30       VELOC6    EQU 82AH;   "          "        (FIVE LOOP TIMES BACK)
         VELOC7    EQU 82CH;   "          "        (SIX LOOP TIMES BACK)
         VELOC8    EQU 82EH;   "          "        (SEVEN LOOP TIMES BACK)
         VELOC9    EQU 830H;   "          "        (EIGHT LOOP TIMES BACK)
         VELOC10   EQU 832H;   "          "        (NINE LOOP TIMES BACK)
35       VELOC11   EQU 834H;   "          "        (TEN LOOP TIMES BACK)
         VELOC12   EQU 836H;   "          "        (ELEVEN LOOP TIMES BACK)
         VELOC13   EQU 838H;   "          "        (TWELVE LOOP TIMES BACK)
         VELOC14   EQU 83AH;   "          "        (THIRTEEN LOOP TIMES BACK)
         VELOC15   EQU 83CH;   "          "        (FOURTEEN LOOP TIMES BACK)
40       VELOC16   EQU 83EH;   "          "        (FIFTEEN LOOP TIMES BACK)
         ;         ********************
         ;         *                  *
         ;         * GENERAL CONSTANTS *
5        ;         *                  *
         ;         ********************
         ;
         MAXREF    EQU 0DACH; CLAMP FOR MAX REFERENCE VALUE (350 FT/SEC)
         MINDEC    EQU 24;    MINIMUM DECEL
10       MAXDEC    EQU 70H;   MAXIMUM DECEL
         RTUP      EQU 40H
         RTDOWN    EQU -200H
```

TABLE 3a

INITIALIZATION

```
15            LD DE,LOWPBM
              XOR A
              SBC HL,DE
              JR C,CONTROLA
              LD A,(INITFLAG)
20            OR A
              JR NZ,CONTROLA
              LD HL,PBMSTEP
              LD (PBM),HL
              LD HL,(VELREF+1)
25            LD C,REFSTEP
              CALL MULTIPLX
              LD (VELREF+1),HL
              LD (VELBLOCK),HL
              LD A,0FFH
30   CONTROLA LD (INITFLAG),A
     CONTROLZ RET

LOWPBM    EQU 4AH
     PBMSTEP   EQU 300H
     REFSTEP   EQU 20B
```

TABLE 3b

MULTIPLX

```
     MULTIPLX EX DE,HL
              XOR A
5             LD H,A
              LD L,A
              LD B,8
     MULTIPLA ADD HL,HL
              RLA
10            RL C
              JR NC,MULTIPLB
              ADD HL,DE
              ADC A,0
     MULTIPLB DJNZ MULTIPLA
15            LD L,H
              LD H,A
```

I claim:

1. In an antiskid brake control system including a braked wheel; means for generating a wheel signal indicative of rotational behavior of the wheel; means for generating a reference signal; means for generating an input signal indicative of the discrepancy between the wheel signal and the reference signal; modulator means for generating a brake control signal as a time integral function of said input signal; and valve means, responsive to said brake control signal, for reducing the braking action applied to said wheel; the improvement comprising:

means for initializing said modulator means by modifying said brake control signal to reduce braking action on said braked wheel, said initializing means operative only during an initial reduction in braking action by said valve means following a period of substantially no reduction in braking action by said valve means;

means for modifying said reference signal in the direction of more aggressive braking in order to initialize the reference signal, said means for modifying said reference signal operative in conjunction with said means for initializing said modulator means; and means for reducing changes in the reference signal in the direction of less aggressive braking for a selected time period following operation of the initializing means.

2. The invention of claim 1, wherein the selected time period is about 0.1 second.

3. The invention of claim 1 wherein the selected time period is about 0.07 second.

4. The invention of claim 1 wherein the means for modifying the reference signal includes means for reducing the magnitude of the reference signal by an amount proportional to the magnitude of the reference signal.

5. The invention of claim 1 wherein said reference signal is representative of a reference wheel velocity and wherein the means for reducing changes in the reference in the direction of less aggressive braking acts to prevent the reference signal from changing in the direction of higher reference wheel velocities.

6. The invention of claim 1 wherein said initializing means includes means for abruptly altering said brake control signal, in the direction of increased reduction in braking action by said valve means, to initialize said modulator means.

7. The invention of claim 1 wherein said initializing means includes means for setting said brake control signal to a preselected value, corresponding to increased reduction in braking action by said valve means to modify said brake control signal.

8. The invention of claim 1 wherein the period of substantially no reduction in braking action is less than about 0.1 second in duration.

9. The invention of claim 1 wherein the means for reducing changes in the reference signal in the direction of less aggressive braking acts to prevent the reference signal from changing in the direction of less aggressive braking.

10. In an antiskid brake control system including a braked wheel; means for generating a wheel signal indicative of rotational behavior of the wheel; means for generating a reference signal; means for generating a brake control signal as a function of the wheel signal and the reference signal; and valve means, responsive to said brake control signal, for reducing the braking action applied to said wheel; the improvement comprising:

means for modifying the reference signal in the direction of more aggressive braking, said modifying means operative only during an initial reduction in braking action by said valve means following a period of substantially no reduction in braking action by said valve means; and means for preventing the reference signal from changing in the direction of less aggressive braking for a selected time period following operation of the modifying means.

11. The invention of claim 10 further comprising:

means for biasing the reference signal in the direction of more aggressive braking for a selected time period following operation of the modifying means.

12. The invention of claim 10 or 11 wherein the selected time period is about 0.1 second.

13. The invention of claim 10 or 11 wherein the selected time period is about 0.07 second.

14. The invention of claim 10 wherein the means for modifying the reference signal includes means for reducing the magnitude of the reference signal by an amount proportional to the magnitude of the reference signal.

15. The invention of claim 10 wherein said reference signal is representative of a reference wheel velocity and wherein the means for reducing changes in the reference in the direction of less aggressive braking acts to prevent the reference signal from changing in the direction of higher reference wheel velocities.

16. The invention of claim 10 wherein the period of substantially no reduction in braking action is less than about 0.1 second in duration.

17. In an antiskid brake control system including a braked wheel; means for generating a wheel signal indicative of rotational behavior of the wheel; means for generating a reference signal; means for generating a brake control signal as a function of the wheel signal and the reference signal; and valve means, responsive to said brake control signal, for reducing the braking action applied to said wheel; the improvement comprising:

means for biasing the reference signal in the direction of more aggressive braking, said biasing means operative only during an initial reduction in braking action by said valve means following a period of substantially no reduction in braking action by said valve means;

said biasing means comprising means for preventing the reference signal from changing in the direction of less aggressive braking.

18. The invention of claim 17 wherein the selected time period is about 0.1 second.

19. The invention of claim 17 wherein the selected time period is about 0.07 second.

20. The invention of claim 17 wherein the reference signal is indicative of a reference wheel velocity and wherein the biasing means acts to bias the reference signal in the direction of lower reference wheel velocities.

21. The invention of claim 17 wherein the reference signal is indicative of a reference wheel velocity and wherein the means for preventing the reference signal from changing in the direction of less aggressive braking acts to prevent the reference signal from changing in the direction of higher reference wheel velocities.

* * * * *

UNITED STATES PATENT AND TRADEMARK OFFICE
CERTIFICATE OF CORRECTION

PATENT NO. : 4,530,058
DATED : July 16, 1985
INVENTOR(S) : Robert D. Cook and Thomas Skarvada It is certified that error appears in the above-identified patent and that said Letters Patent is hereby corrected as shown below:

In column 1, line 42, please delete "or" and substitute therefor --on--;

In column 2, line 22, please delete "to" and substitute therefor --the--;

In column 2, line 22, please insert --,-- after "initialization" (first occurrence);

In column 3, line 65, please delete "100" and substitute therefor --110--;

In column 3, line 67, please delete "10" and substitute therefor --110--;

UNITED STATES PATENT AND TRADEMARK OFFICE
CERTIFICATE OF CORRECTION

PATENT NO. : 4,530,058
DATED : July 16, 1985
INVENTOR(S) : Robert D. Cook and Thomas Skarvada It is certified that error appears in the above-identified patent and that said Letters Patent is hereby corrected as shown below:

In column 4, line 17, please delete "supplied" and substitute therefor --applied--;

In column 4, line 33, please delete "pat" and substitute therefor --part--;

In column 4, line 38, please delete "100" (second occurrence) and substitute therefor --110--;

In column 4, line 63, please delete "100" and substitute therefor --110--;

In column 5, line 12, please delete "to" and substitute therefor --no--; (1st occurrence).

In column 6, line 33, please delete "then" and substitute therefor --when--;

UNITED STATES PATENT AND TRADEMARK OFFICE
CERTIFICATE OF CORRECTION

PATENT NO. : 4,530,058
DATED : July 16, 1985
INVENTOR(S) : Robert D. Cook, and Thomas Skarvada       Page 3 of 3

It is certified that error appears in the above-identified patent and that said Letters Patent is hereby corrected as shown below:

In column 7, line 62, please delete "limiting" and substitute therefor --listing--;

In column 8, line 1, please delete "program" and substitute therefor --system--;

In claim 2 (column 19, line 31), please delete "claim 1," and substitute therefor --claim 1--.

Signed and Sealed this

Twenty-first Day of October, 1986

[SEAL]

*Attest:*

DONALD J. QUIGG

*Attesting Officer*     *Commissioner of Patents and Trademarks*